(12) United States Patent
Overfield et al.

(10) Patent No.: US 9,289,930 B2
(45) Date of Patent: Mar. 22, 2016

(54) WEAR RESISTANT ASSEMBLY FOR CONTACTING COMPONENTS OF MOLD-TOOL SYSTEM

(75) Inventors: Sarah Kathleen Overfield, Colchester, VT (US); Stephen Linwood Gray, Cambridge, VT (US); Douglas Oliver Hall, South Jeffersonville, VT (US)

(73) Assignee: Husky Injection Molding Systems Ltd., Bolton, Ontario (CA)

(*) Notice: Subject to any disclaimer, the term of this patent is extended or adjusted under 35 U.S.C. 154(b) by 88 days.

(21) Appl. No.: 14/118,911

(22) PCT Filed: Jun. 8, 2012

(86) PCT No.: PCT/US2012/041454
§ 371 (c)(1),
(2), (4) Date: Nov. 20, 2013

(87) PCT Pub. No.: WO2012/170758
PCT Pub. Date: Dec. 13, 2012

(65) Prior Publication Data
US 2014/0084513 A1    Mar. 27, 2014

Related U.S. Application Data

(60) Provisional application No. 61/495,038, filed on Jun. 9, 2011.

(51) Int. Cl.
*B29C 45/20* (2006.01)
*B29C 45/27* (2006.01)

(52) U.S. Cl.
CPC ............... *B29C 45/20* (2013.01); *B29C 45/27* (2013.01); *B29C 45/278* (2013.01); *B29C 45/2735* (2013.01); *B29C 2045/2762* (2013.01); *B29C 2045/2772* (2013.01); *B29C 2045/2774* (2013.01); *B29C 2045/2787* (2013.01)

(58) Field of Classification Search
CPC ............... B29C 2045/2729; B29C 2045/2761; B29C 2045/2762
See application file for complete search history.

(56) References Cited

U.S. PATENT DOCUMENTS

| 4,219,323 | A | * | 8/1980 | Bright et al. ................... 425/572 |
| 5,028,227 | A | | 7/1991 | Gellert et al. |
| 5,299,928 | A | | 4/1994 | Gellert |
| 5,925,386 | A | | 7/1999 | Moberg |

(Continued)

FOREIGN PATENT DOCUMENTS

| CA | 942019 A1 | 2/1974 |
| EP | 2177339 A1 | 4/2010 |

(Continued)

OTHER PUBLICATIONS

European Search Report, Feb. 13, 2015, 6 pages.

(Continued)

*Primary Examiner* — Jill Heitbrink

(57) ABSTRACT

A mold-tool system (10), comprising: a first component (12) defining a first passageway (13) configured to convey, in use, a flowable molding material; a second component (14) defining a second passageway (15) configured to: (i) be in fluid communication with the first passageway (13), and (ii) convey, in use, the flowable molding material. A wear-resistant assembly (16) contacts, at least in part, the first component (12) and the second component (14).

12 Claims, 15 Drawing Sheets

(56) References Cited

U.S. PATENT DOCUMENTS

| | | | |
|---|---|---|---|
| 6,164,954 A | 12/2000 | Mortazavi et al. | |
| 6,454,558 B1 * | 9/2002 | Gellert | B29C 45/322 |
| | | | 264/328.8 |
| 6,561,790 B2 | 5/2003 | Blais et al. | |
| 6,609,902 B1 | 8/2003 | Blais et al. | |
| 7,128,566 B2 | 10/2006 | Babin | |
| 7,134,868 B2 | 11/2006 | Babin et al. | |
| 7,137,807 B2 | 11/2006 | Babin et al. | |
| 7,189,071 B2 * | 3/2007 | Olaru | B29C 45/27 |
| | | | 425/549 |
| 7,223,092 B2 | 5/2007 | Fischer et al. | |
| 7,507,081 B2 | 3/2009 | Guenther et al. | |
| 7,540,076 B2 | 6/2009 | Blais | |
| 7,549,855 B2 | 6/2009 | Jenko et al. | |
| 7,654,818 B2 | 2/2010 | Haque | |
| 2004/0071817 A1 | 4/2004 | Fischer et al. | |
| 2008/0050466 A1 * | 2/2008 | Gaillard | B29C 45/322 |
| | | | 425/572 |
| 2008/0092388 A1 * | 4/2008 | Bouti | B23K 15/0053 |
| | | | 29/890.142 |
| 2008/0279978 A1 * | 11/2008 | Babin | B29C 45/2725 |
| | | | 425/549 |
| 2010/0034920 A1 * | 2/2010 | Fairy et al. | 425/547 |
| 2010/0092601 A1 | 4/2010 | Klobucar et al. | |

FOREIGN PATENT DOCUMENTS

| | | |
|---|---|---|
| JP | S59115822 A | 7/1984 |
| JP | S59150736 A | 8/1984 |
| JP | H02253913 A | 10/1990 |
| JP | H06170895 A | 6/1994 |
| JP | 2005132026 A | 5/2005 |
| WO | 2010/133207 | * 11/2010 |

OTHER PUBLICATIONS

International Search Report, 3 pages.

* cited by examiner

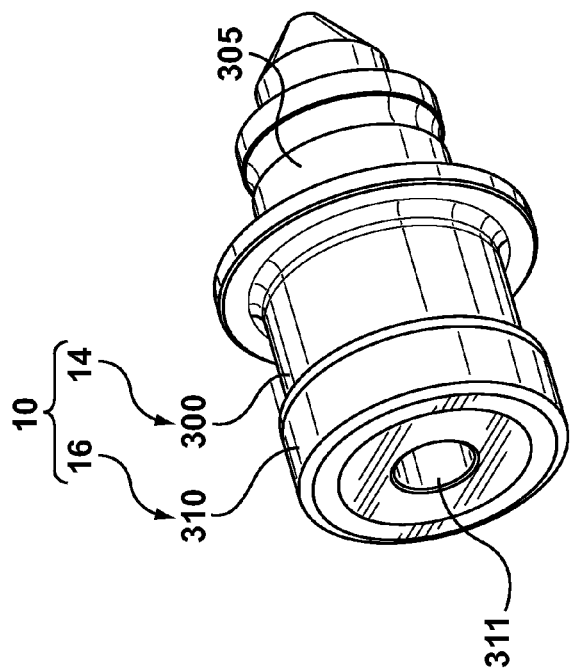
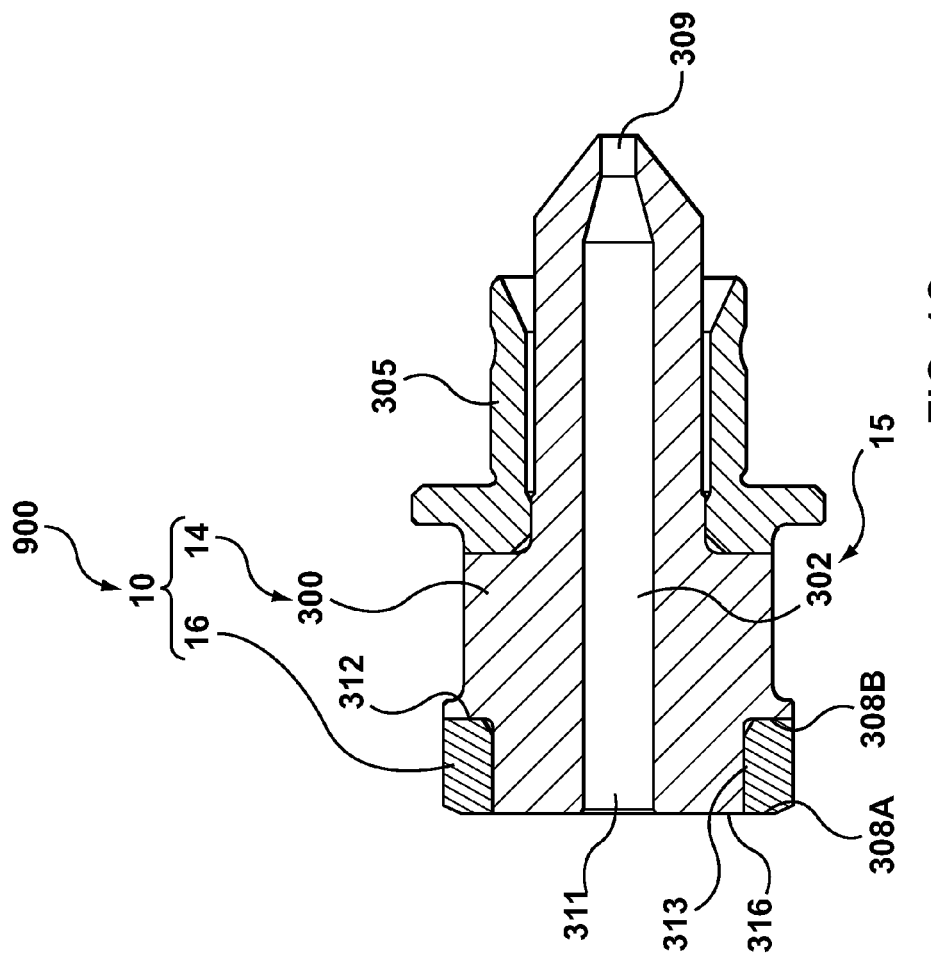
FIG. 1B
FIG. 1C

WEAR RESISTANT ASSEMBLY FOR CONTACTING COMPONENTS OF MOLD-TOOL SYSTEM

TECHNICAL FIELD

An aspect generally relates to (but is not limited to) a mold-tool system and/or a molding system having the mold-tool system.

BACKGROUND

The function of a hot runner in an injection molding system is to contain and distribute molten, pressurized resin. Resin that escapes the distribution system flow paths can lead to system downtime, excessive maintenance and/or component failure and replacement. A challenge in the design of the distribution system is the management of the flow path connection between separate components.

A hot runner distribution system is typically comprised of several component types: a sprue to receive molten resin from the injection nozzle, a manifold to distribute the resin to several ports, and a plurality of nozzles to transfer the resin from the manifold ports to the receiving cavities in the mold. Each of these components may have a different material composition, due to desired thermal, strength, or wear characteristics. Different material types results in differing rates of thermal expansion for the components. This may be understood as relative motion between the components during the heat up and cool down phases of operation. High thermal conductivity is often a desirable trait for hot runner components. However, highly conductive materials tend to possess poor wear resistance. Relative motion between components may also occur during the assembly or maintenance periods.

Transfer of molten resin from one component to another is often achieved by seating the two components against each other and applying a sealing load. This load must be sufficient to resist the separation force generated by the resin pressure over the desired operational temperature range. However, an excessive load can damage the components and compromise the seal by creating surface damage that creates a resin leak path. Excessive load can also cause yielding of the components which can lead to component fracture and failure. The sealing load is often applied in the assembled or cold condition. This causes a load to be applied during the heat up and cool down phases that are periods of relative motion. Load combined with sliding contact increases the potential for surface damage of the sliding components. There may also be load applied during the assembly process.

Dissimilar material types, relative motion between components and high sealing loads contribute to the challenge of interface design. The following present invention describes an improvement in the design of hot runner component sealing interfaces that improves seal function while also allowing relative motion and the use of desired material types.

U.S. Pat. Nos. 5,299,928, 5,925,386, 6,164,954, 6,561,790, 6,609,902, 7,128,566, 7,137,807, 7,223,092, 7,507,081, 7,540,076, 7,549,855, 7,654,818, and U.S. Patent Publication No. 2004/0071817 disclose how thermal conductivities and/or wear resistant properties may be considered in a hot runner.

SUMMARY

The inventors have researched a problem associated with known molding systems that inadvertently manufacture bad-quality molded articles or parts. After much study, the inventors believe they have arrived at an understanding of the problem and its solution, which are stated below, and the inventors believe this understanding is not known to the public.

In order to provide a solution, at least in part, to the above issues, according to one aspect, there is provided a mold-tool system (10), comprising: a first component (12) defining a first passageway (13) configured to convey, in use, a flowable molding material; a second component (14) defining a second passageway (15) configured to: (i) be in fluid communication with the first passageway (13), and (ii) convey, in use, the flowable molding material. A wear-resistant assembly (16) contacts, at least in part, the first component (12) and the second component (14). Other aspects are identified in the claims.

Other aspects and features of the non-limiting embodiments will now become apparent to those skilled in the art upon review of the following detailed description of the non-limiting embodiments with the accompanying drawings.

BRIEF DESCRIPTION OF THE DRAWINGS

FIG. 1B is a perspective view of a mold-tool system including a nozzle tip assembly.

FIG. 1C is a cut-out side view of a mold-tool system including a nozzle tip assembly.

DETAILED DESCRIPTION OF THE DRAWINGS

Figure 1A:
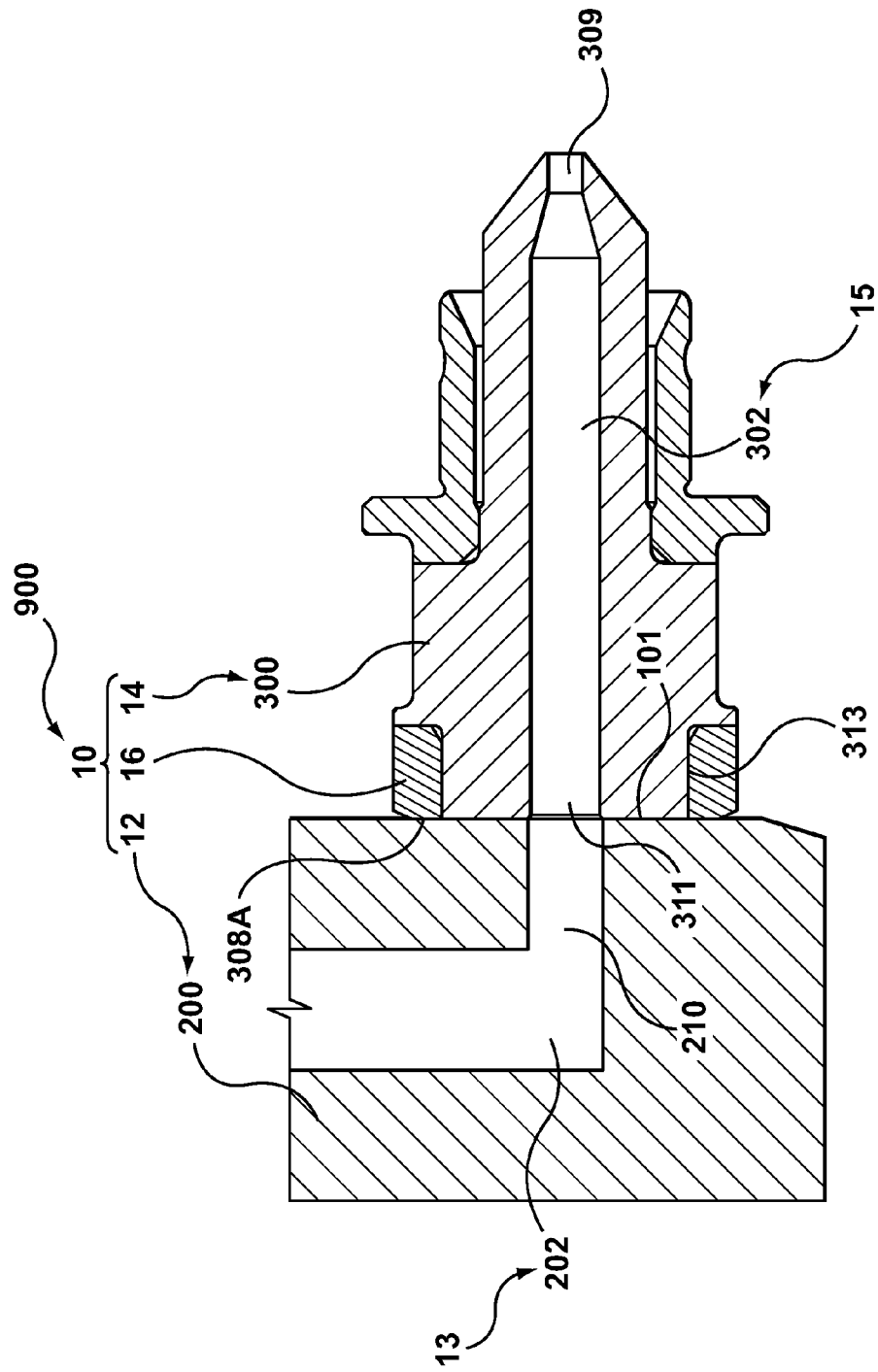
FIG. 1A is a cut-out side view of a mold-tool system including a nozzle assembly and a nozzle tip assembly.
Figure 1D:
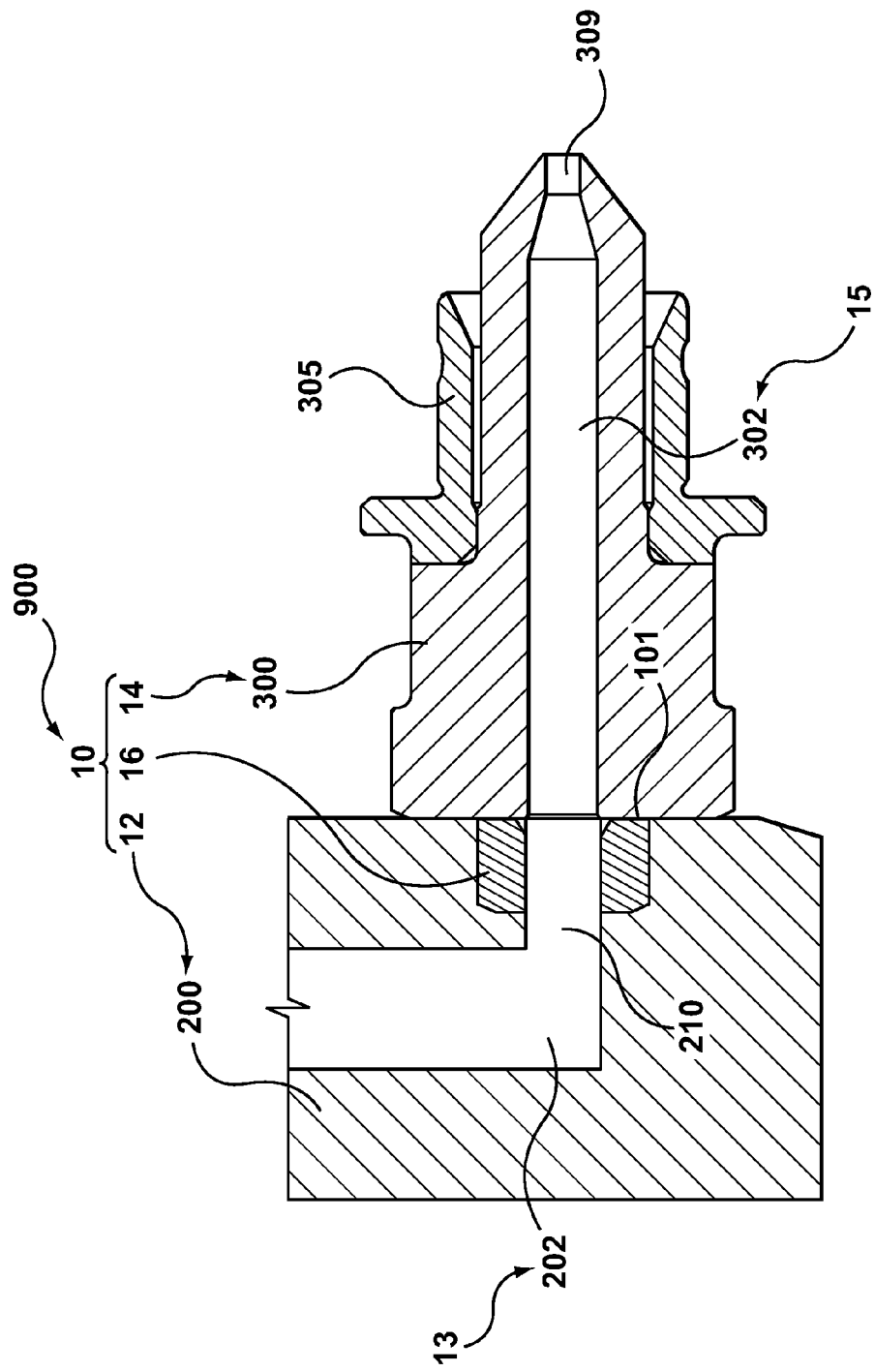
FIG. 1D is a cut-out side view of a mold-tool system including a nozzle tip assembly and a nozzle tip assembly.
Figure 1E:
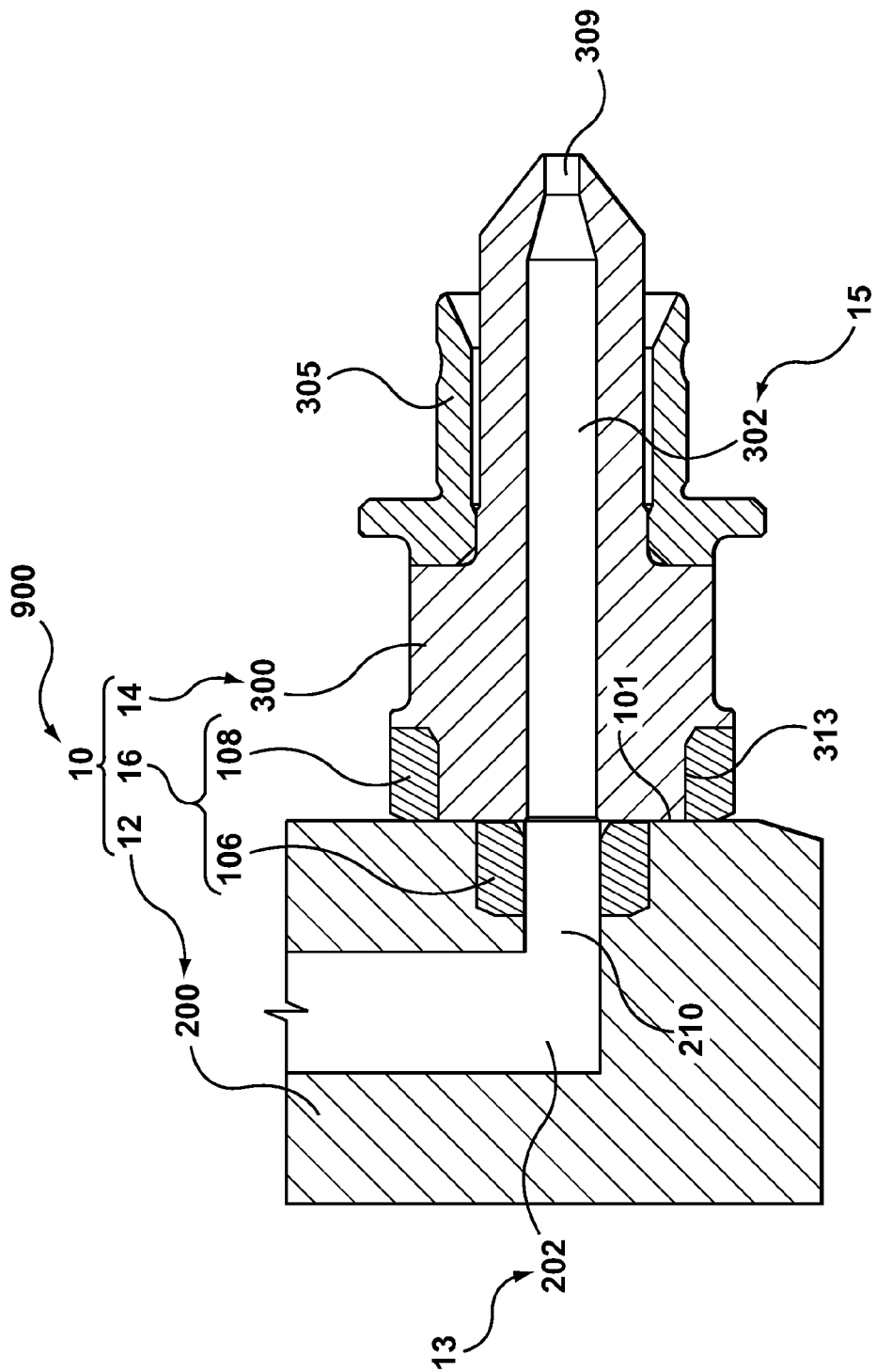
FIG. 1E is a cut-out side view of a mold-tool system including a nozzle tip assembly and a nozzle tip assembly.

The non-limiting embodiments will be more fully appreciated by reference to the following detailed description of the non-limiting embodiments when taken in conjunction with the accompanying drawings, in which:

FIGS. 1A, 1B, 1C, 1D, 1E, 1F, 1G, 2A, 2B, 2C, 3A, 3B, 3C, 4A, 4B, 4C depict schematic representations of examples of a mold-tool system (10).

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

FIGS. 1A, 1B, 1C, 1D, 1E, 1F, 1G, 2A, 2B, 2C, 3A, 3B, 3C, 4A, 4B, 4C depict the schematic representations of the examples of the mold-tool system (10). It will be appreciated that the examples depicted in FIGS. may be combined in any suitable permutation and combination. The mold-tool system (10) may include components that are known to persons skilled in the art, and these known components will not be described here; these known components are described, at least in part, in the following reference books (for example): (i) "*Injection Molding Handbook*" authored by OSSWALD/ TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" 3$^{rd}$ Edition authored by JOHANNABER (ISBN 3-446-17733-7) and/or (iv) "*Runner and Gating Design Handbook*" authored by BEAUMONT (ISBN 1-446-22672-9). It will be appreciated that for the purposes of this document, the phrase "includes (but is not limited to)" is equivalent to the word "comprising." The word "comprising" is a transitional phrase or word that links the preamble of a patent claim to the specific elements set forth in the claim that define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim. The definition of the mold-tool system (10) is as follows: a system that may be positioned and/or may be used in an envelope defined by a platen system of the molding system (900), such as an injection-molding system for example. The platen system may include a stationary platen and a movable platen that is moveable relative to the stationary platen. A runner system (known and not depicted) may include the mold-tool system (10).

Referring now to all to the FIGS, generally speaking, the mold-tool system (10) includes (and is not limited to) a combination of: (i) a first component (12), (ii) a second component (14), and (iii) a wear-resistant assembly (16). The first component (12) defines a first passageway (13) configured to convey, in use, a flowable molding material. The second component (14) defines a second passageway (15) configured to: (i) be in fluid communication with the first passageway (13), and (ii) convey, in use, the flowable molding material. The wear-resistant assembly (16) contacts, at least in part, the first component (12) and the second component (14). More specifically, the second passageway (15) is in fluid communication with the first passageway (13) at a sealing interface (101) between the first component (12) and the second component (14). As well, the wear-resistant assembly (16) is positioned, at least in part, proximate to the sealing interface (101). The wear-resistant assembly (16) improves, at least in part, sealing efficiency of the sealing interface (101), and/or reduces, at least in part, inadvertent or unwanted leakage at the sealing interface (101), or at the very least prolongs inadvertent leakage of resin (molding material) at the sealing interface (101). By way of example, the wear-resistant assembly (16) includes (and is not limited to): an alloy of beryllium copper (BeCu) alloy 25 or other suitable wear resistant material. More specifically, the wear-resistant assembly (16) is configured to limit direct sliding-seal contact between the first component (12) and the second component (14).

It will be appreciated that there are many options for placement or location of the wear-resistant assembly (16) relative to the first component (12) and the second component (14).

With reference to FIGS. 1D, 1E, 2A, 2C, 3B, 3C, 4B, 4C there are depicted several examples of the mold-tool system 910), in which the wear-resistant assembly (16) received, at least in part, by the first component (12).

With reference to FIGS. 1A, 1B, 1C, 1E, 1G, 2B, 2C, 3A, 3C, 4A, 4C there are depicted several examples of the mold-tool system (10), in which the wear-resistant assembly (16) received, at least in part, by the second component (14).

In view of the above examples, it will be appreciated that, in accordance with another example, the wear-resistant assembly (16) is received, at least in part, by the first component (12) and by the second component (14) provided that, naturally, this arrangement does not interfere with normal operation of the mold-tool system (10).

With reference to FIGS. 1E, 2C, 3C, 4C there are depicted several examples of the mold-tool system (10), in which the wear-resistant assembly (16) includes (and is not limited to): (i) a first wear-resistant assembly (106), and (ii) a second wear-resistant assembly (108). The first wear-resistant assembly (106) is received, at least in part, by the first component (12). The second wear-resistant assembly (108) received, at least in part, by the second component (14). More specifically in accordance with another example, FIGS. 1E, 2C, 3C, 4C depict examples in which the first wear-resistant assembly (106) contacts, at least in part, the second wear-resistant assembly (108). It will also be appreciated that for the case in which: (i) the first wear-resistant assembly (106) contacts, at least in part, the second component (14), and (ii) the second wear-resistant assembly (108) contacts, at least in part, the first component (12), then (in accordance with another example) the first wear-resistant assembly (106) does not contact the second wear-resistant assembly (108), provided that (naturally) this arrangement does not interfere with normal operation of the mold-tool system (10).

Referring now to FIGS. 1A, 1B, 1C, 1D, 1E, 1F, 1G, there are depicted depict several schematic representations of an example of the mold-tool system (10), in which the first component (12) includes a nozzle assembly (200), and the second component (14) includes a nozzle-tip assembly (300). The first passageway (13) includes a nozzle-melt channel (202) defined by the nozzle assembly (200). The second passageway (15) includes a tip-melt channel (302) defined by the nozzle-tip assembly (300). A tip inlet (311) of the nozzle-tip assembly (300) is in fluid communication with a nozzle outlet (210) of the nozzle assembly (200). The nozzle-tip assembly (300) may include (and is not limited to): a seal assembly (305) that surrounds, at least in part, an outer surface of the nozzle-tip assembly (300). The nozzle-tip assembly (300) may also define a tip-melt channel (302) that extends from a tip outlet (309) to a tip inlet (311). The nozzle-tip assembly (300) may also provide a press-fit surface (313). The wear-resistant assembly (16) may include (and is not limited to): a first opposite side (308A) and a second opposite side (308B). The first opposite side (308A) is configured to contact the nozzle assembly (200). The second opposite side (308B) is configured to contact the nozzle-tip assembly (300). According to a variation, the nozzle-tip assembly (300) has the wear-resistant assembly (16) that is press fitted to the press-fit surface (313) of the nozzle-tip assembly (300). According to another option (and not limited to): the wear-resistant assembly (16) is attached adjacent to a tip-sliding surface (316) of the nozzle-tip assembly (300). According to another option (and not limited to): the wear-resistant assembly (16) is attached to the nozzle-tip assembly (300), by various methods (such as press fitting, welding, and/or brazing). According to a specific example (and not limited to) the wear-resistant assembly (16) includes a ring structure (310) that is configured to mate with an end portion (312) of the nozzle-tip assembly (300). The ring structure (310) is ring shaped for geometrical convenience.

Figure 1F:
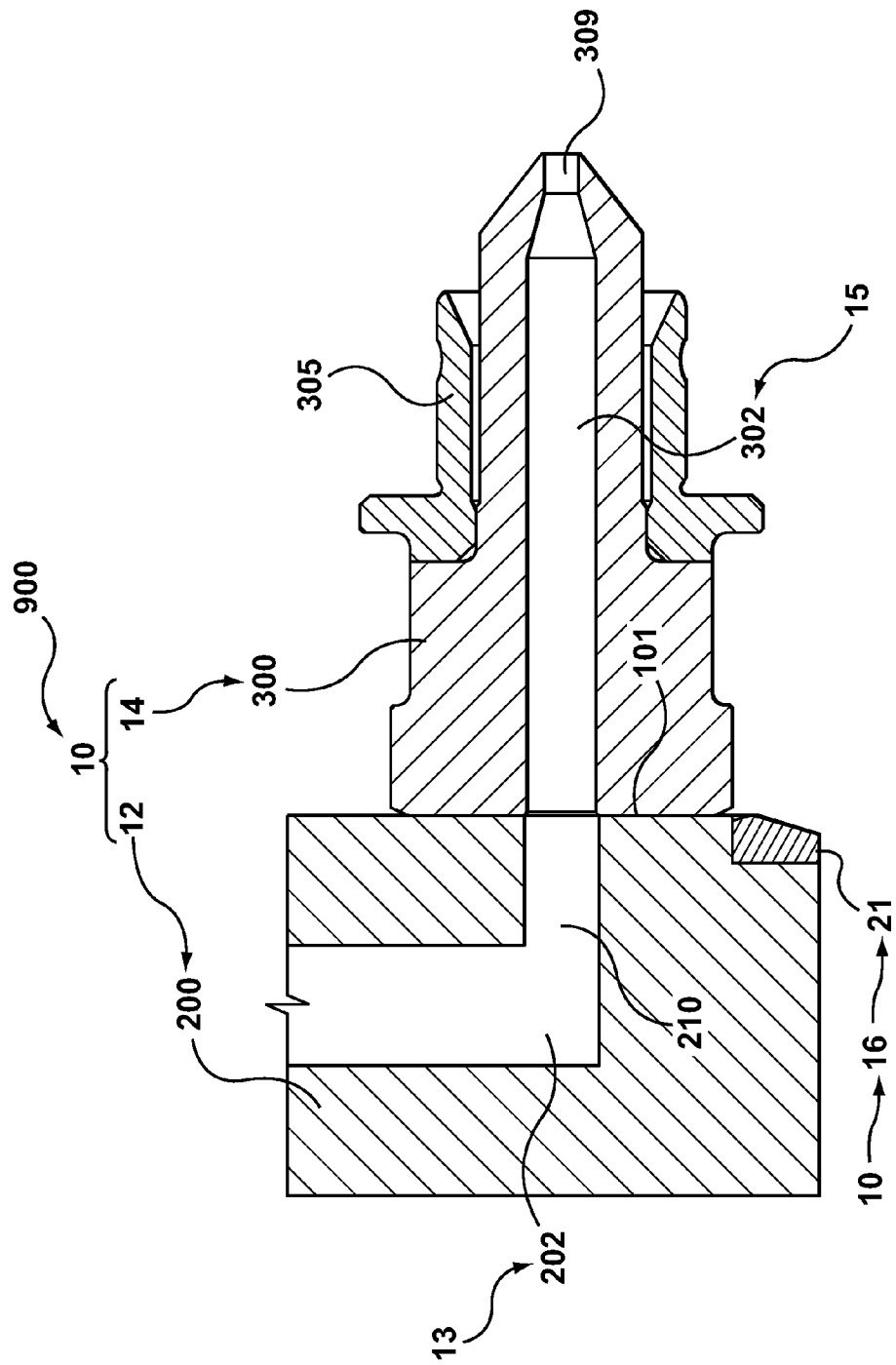
FIG. 1F is a cut-out side view of a mold-tool system including a nozzle tip assembly and a nozzle tip assembly.
Figure 1G:
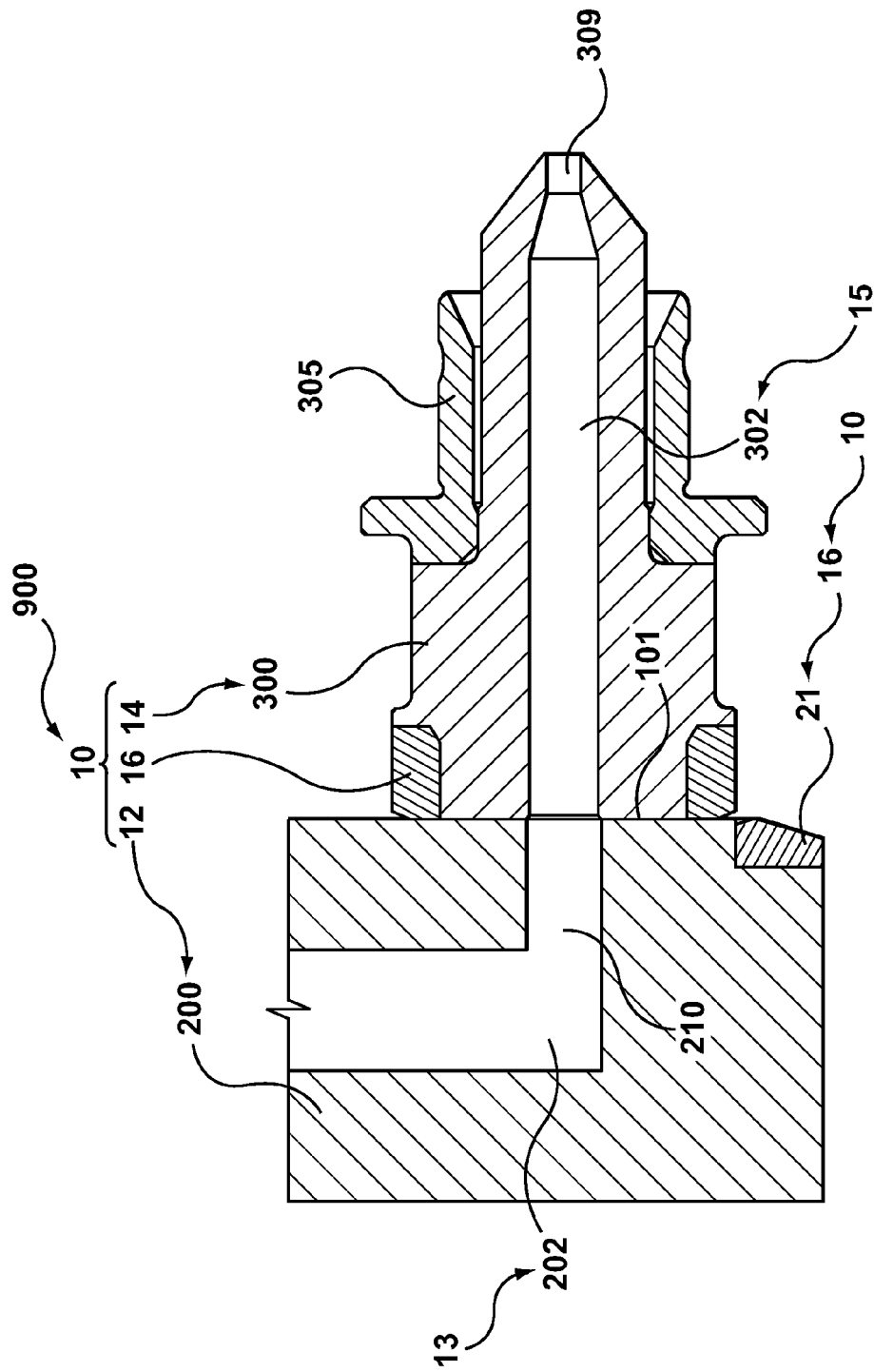
FIG. 1G is a cut-out side view of a mold-tool system including a nozzle tip assembly and a nozzle tip assembly.

Referring now to FIG. 1F, there are depicted depict a schematic representation of an example of the mold-tool system (10), in which the wear-resistant assembly (16) includes (and is not limited to): an auxiliary-wear assembly (21) that is positioned offset from the wear-resistant assembly (16) along the sealing interface (101). The auxiliary-wear assembly (21) may be used for the case where the nozzle-tip assembly (300) is slid to its operational position along the sealing interface (101) along a radial direction. For the case where the nozzle-tip assembly (300) is positioned to its operation position along an axial direction then the auxiliary-wear assembly (21) is not required.

Figure 2A:
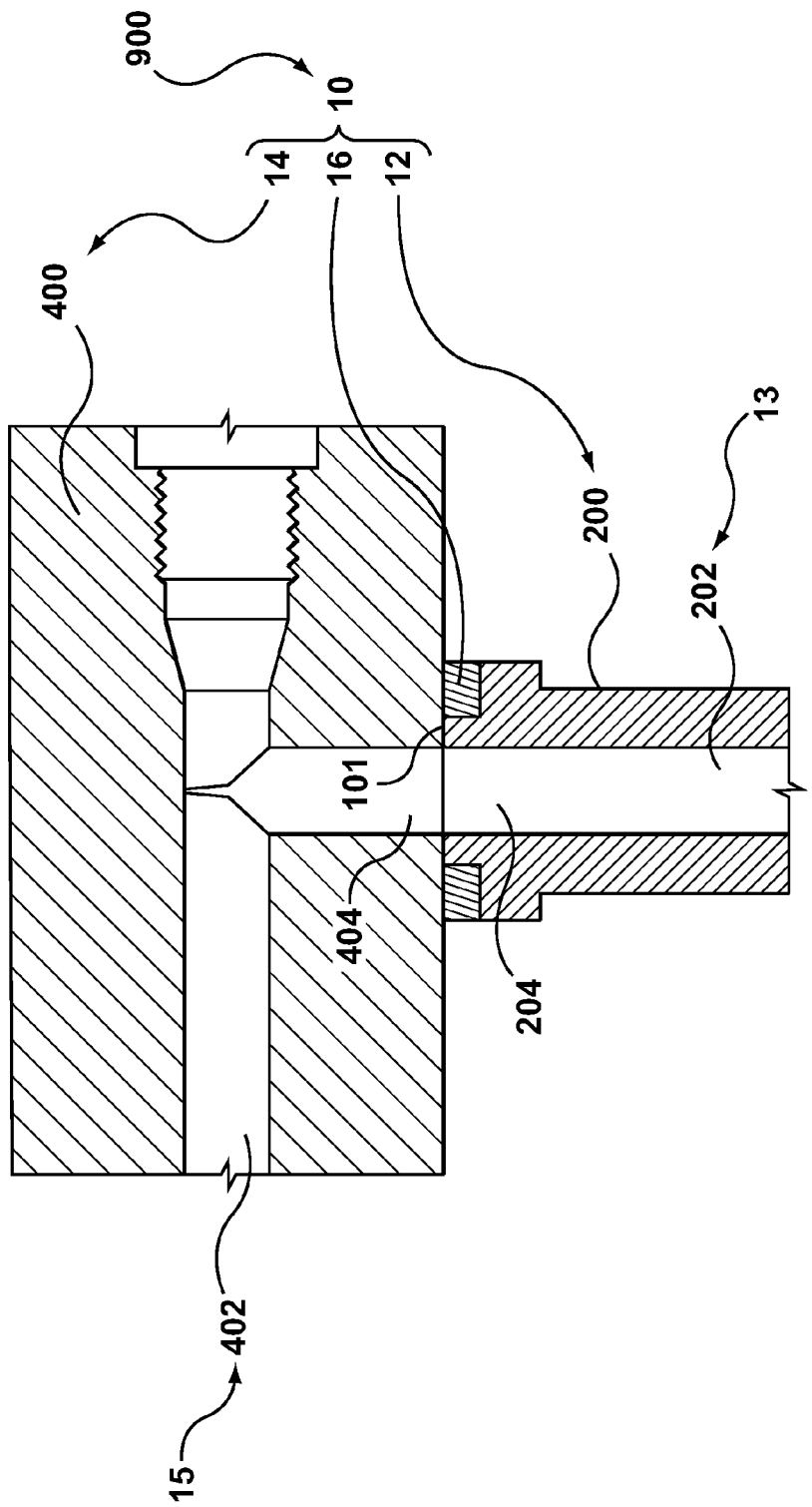
FIG. 2A is a cut-out side view of a mold-tool system including a nozzle tip assembly and a manifold assembly.
Figure 2B:
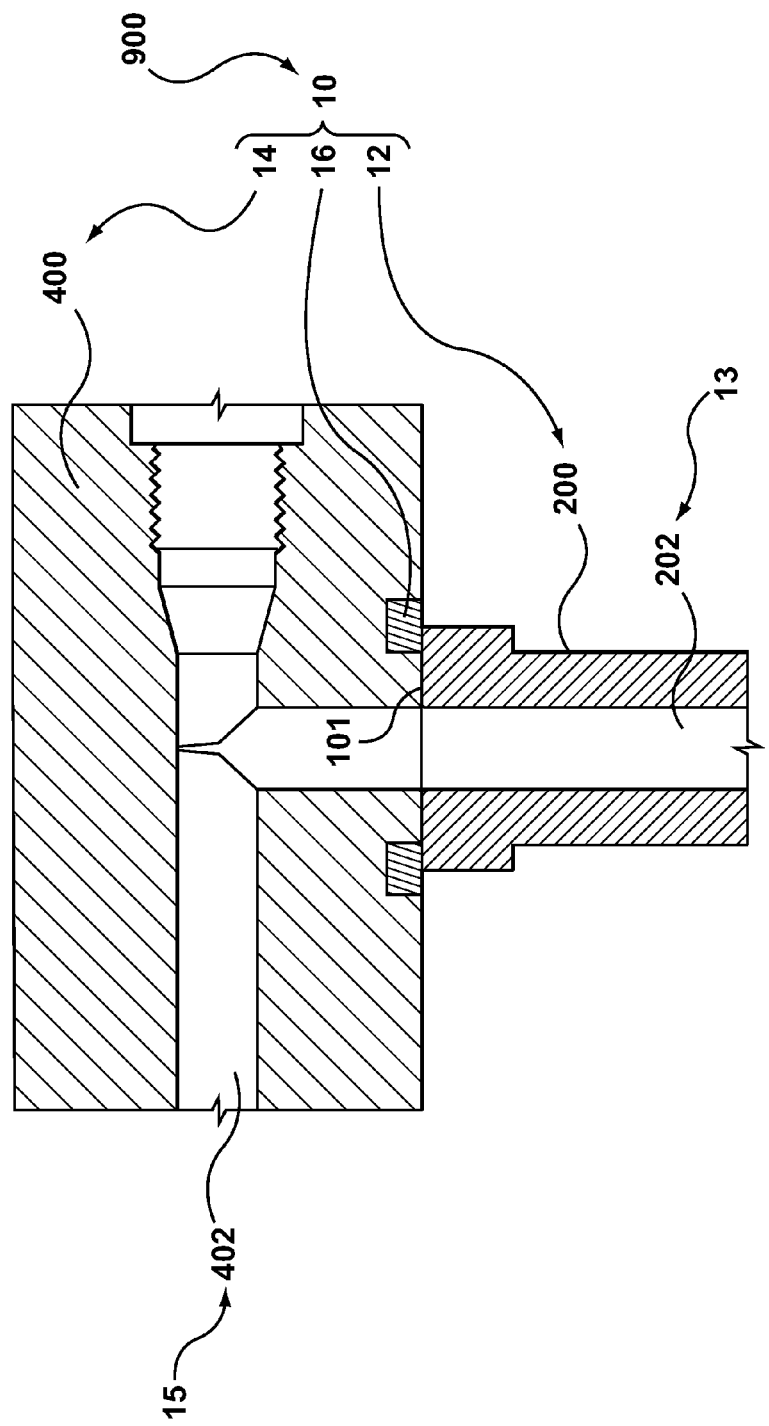
FIG. 2B is a cut-out side view of a mold-tool system including a nozzle tip assembly and a manifold assembly.
Figure 2C:
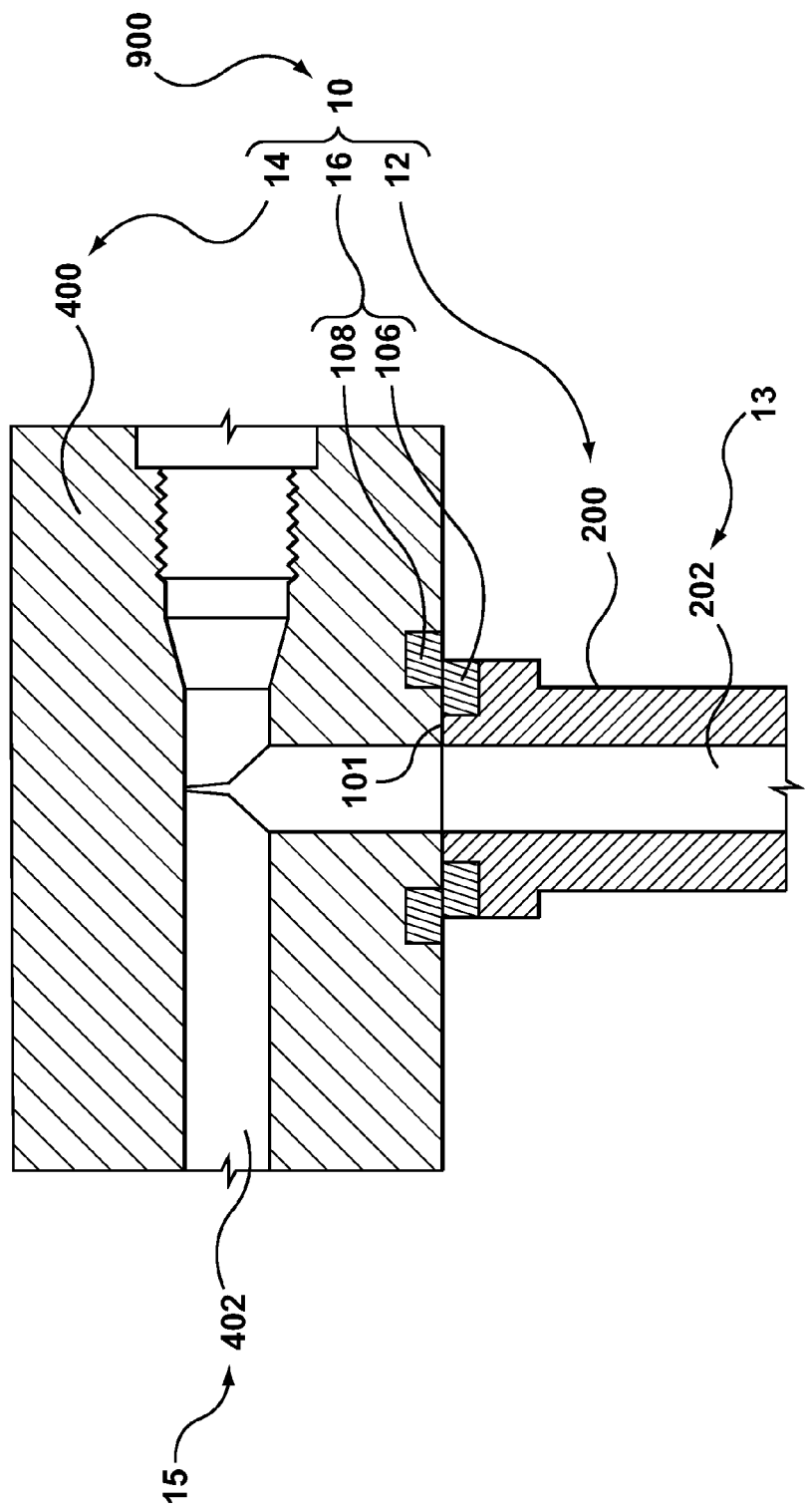
FIG. 2C is a cut-out side view of a mold-tool system including a nozzle tip assembly and a manifold assembly.

Referring now to FIGS. 2A, 2B, 2C, there are depicted depict several schematic representations of an example of the mold-tool system (10), in which the first component (12) includes a nozzle assembly (200), and the second component (14) includes a manifold assembly (400). The first passageway (13) includes a nozzle-melt channel (202) defined by the nozzle assembly (200). The second passageway (15) includes a manifold melt channel (402) defined by the nozzle-tip assembly (300). A manifold outlet (404) of the manifold assembly (400) is in fluid communication with a nozzle inlet (204) of the nozzle assembly (200).

Figure 3A:
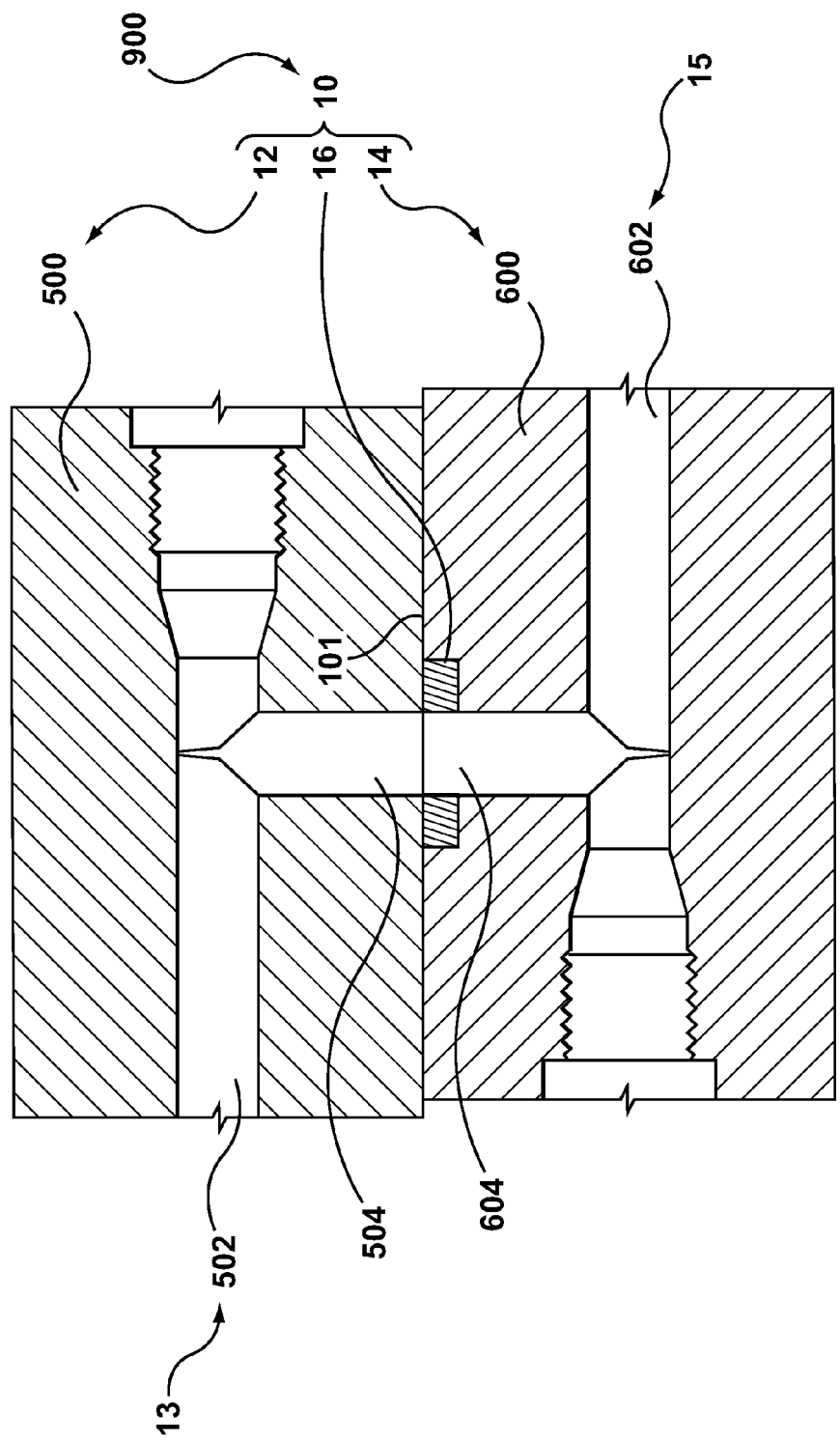
FIG. 3A is a cut-out side view of a mold-tool system including a main-manifold assembly and a cross-manifold assembly.
Figure 3B:
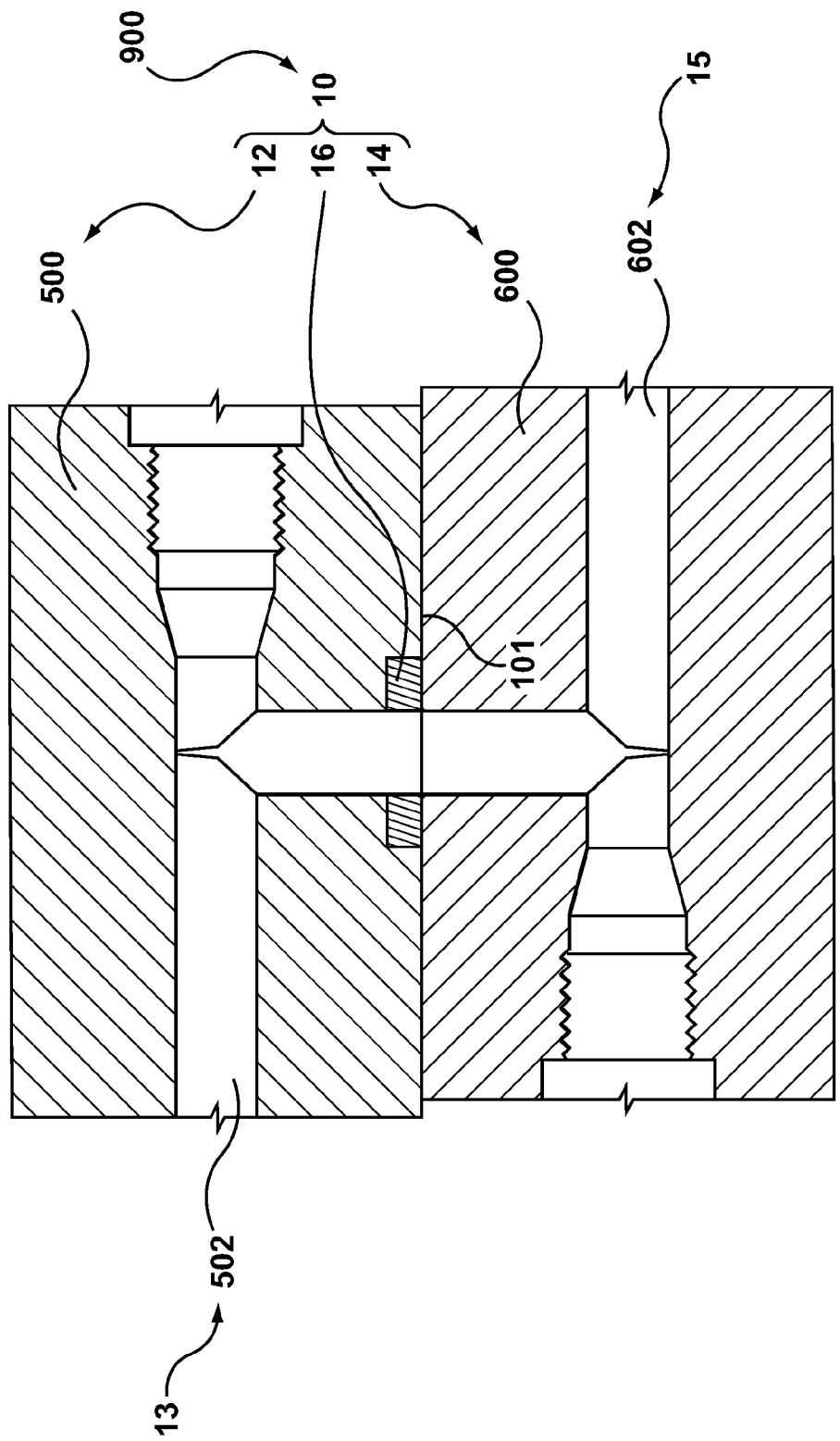
FIG. 3B is a cut-out side view of a mold-tool system including a main-manifold assembly and a cross-manifold assembly.
Figure 3C:
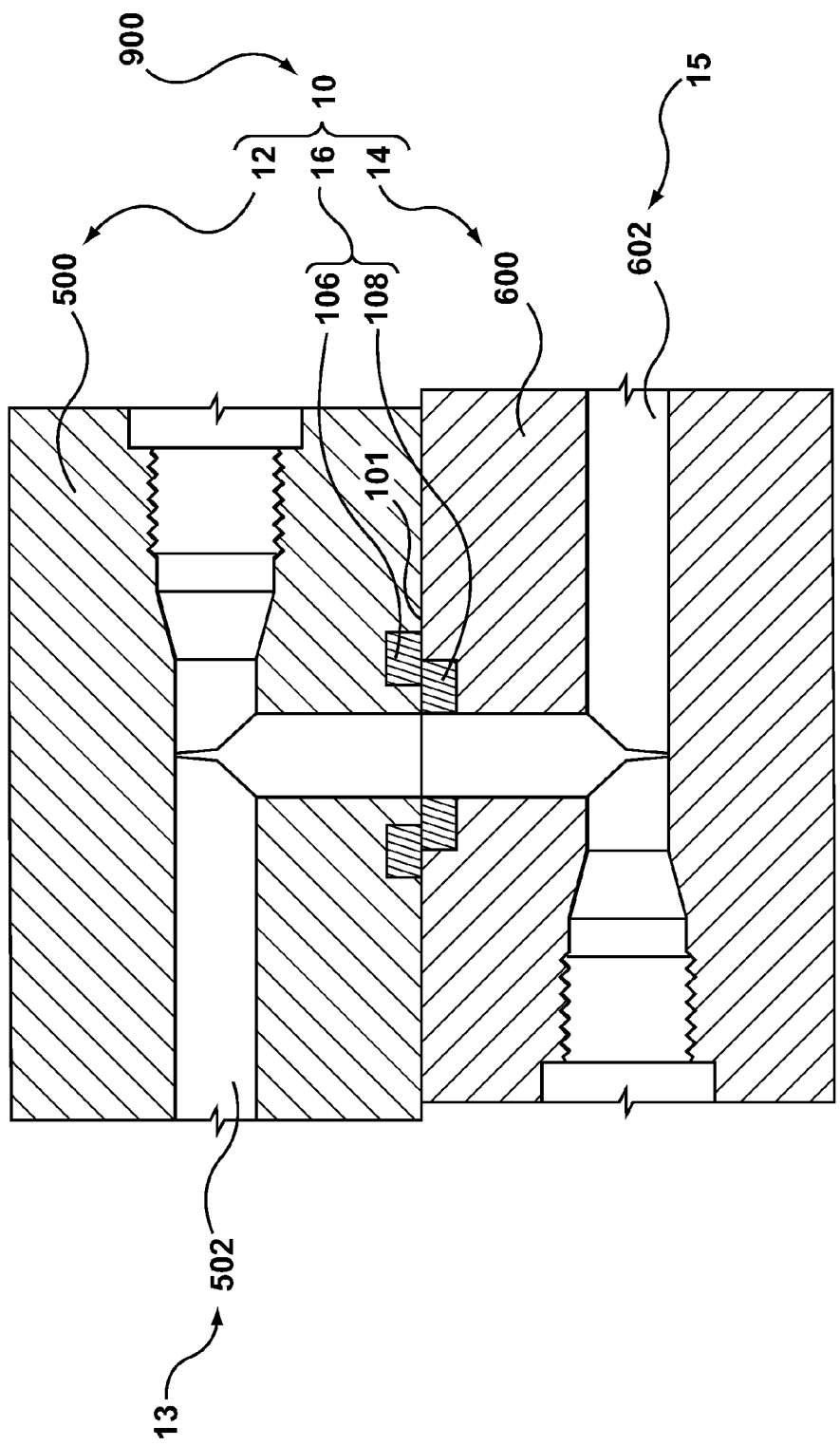
FIG. 3C is a cut-out side view of a mold-tool system including a main-manifold assembly and a cross-manifold assembly.

Referring now to FIGS. 3A, 3B, 3C, there are depicted depict several schematic representations of an example of the mold-tool system (10), in which the first component (12) includes a cross-manifold assembly (500), and the second component (14) includes a main-manifold assembly (600). The first passageway (13) includes a cross-manifold melt channel (502) defined by the cross-manifold assembly (500). The second passageway (15) includes a main-manifold melt channel (602) defined by the main-manifold assembly (600). A cross manifold outlet (504) of the cross-manifold assembly (500) is in fluid communication with a main-manifold inlet (604) of the main-manifold assembly (600).

Figure 4A:
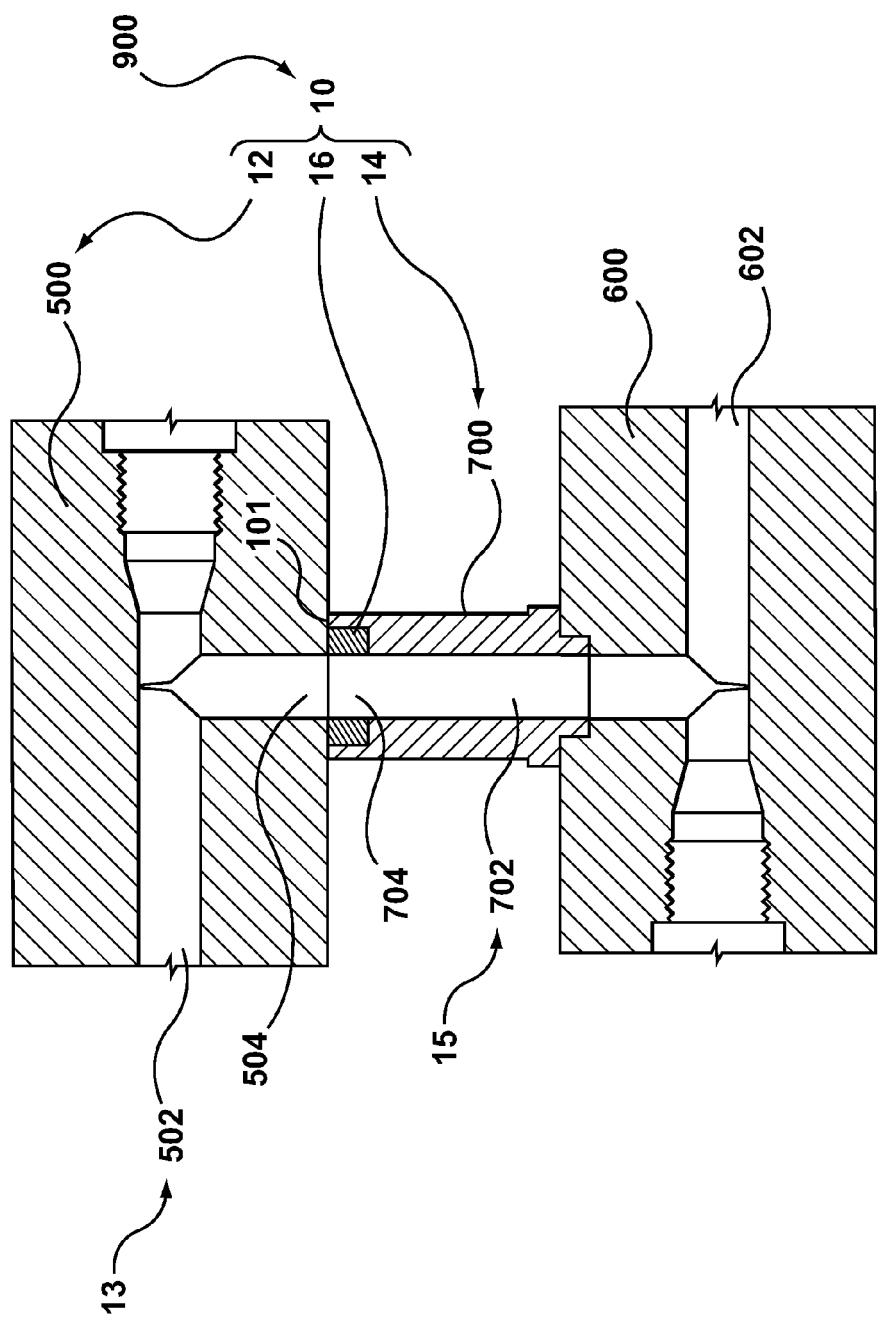
FIG. 4A is a cut-out side view of a mold-tool system including a main-manifold assembly, a transfer-sprue assembly and a cross-manifold assembly.
Figure 4B:
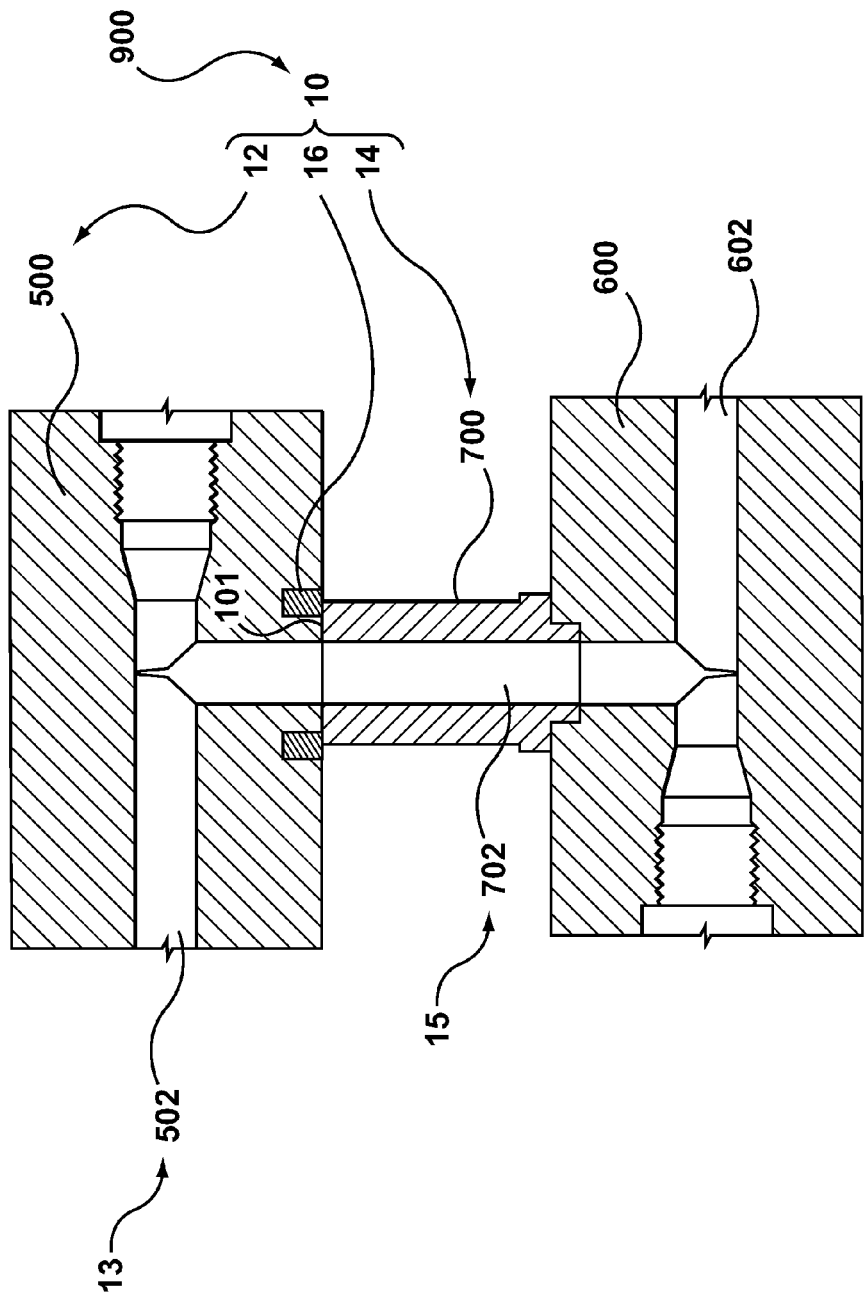
FIG. 4B is a cut-out side view of a mold-tool system including a main-manifold assembly, a transfer-sprue assembly and a cross-manifold assembly.
Figure 4C:
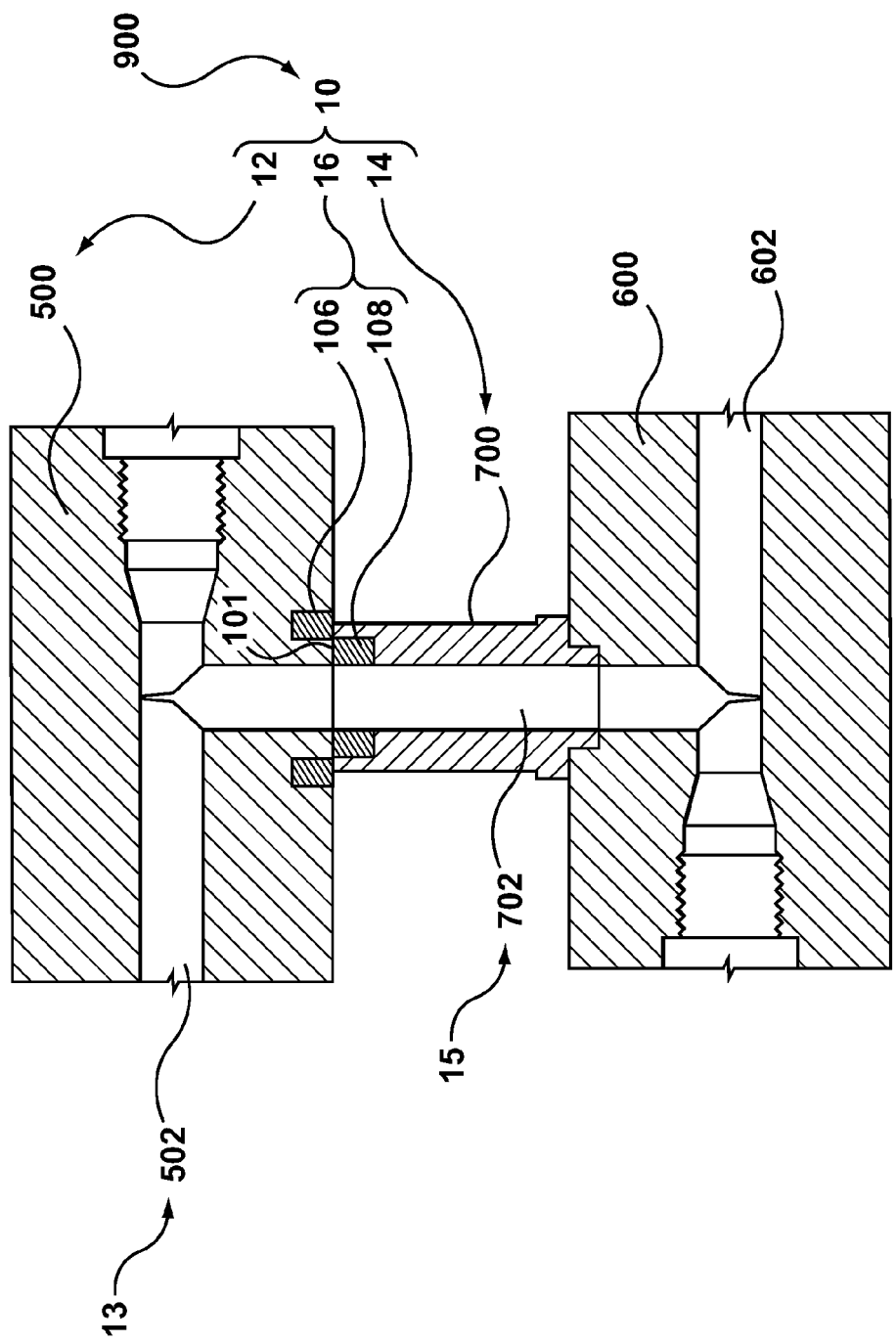
FIG. 4C is a cut-out side view of a mold-tool system including a main-manifold assembly, a transfer-sprue assembly and a cross-manifold assembly.

Referring now to FIGS. 4A, 4B, 4C, there are depicted depict several schematic representations of an example of the mold-tool system (10), in which the first component (12) includes a cross-manifold assembly (500), and the second component (14) includes a transfer-sprue assembly (700). The first passageway (13) includes a cross-manifold melt channel (502) defined by the cross-manifold assembly (500). The second passageway (15) includes a transfer-sprue melt channel (702) defined by the transfer-sprue assembly (700). A cross manifold outlet (504) of the cross-manifold assembly (500) is in fluid communication with a transfer-sprue inlet (704) of the transfer-sprue assembly (700).

Additional Description

The following clauses are offered as further description of the examples of the mold-tool system (10): Clause (1): a mold-tool system (10), comprising: a first component (12) defining a first passageway (13) configured to convey, in use, a flowable molding material; a second component (14) defining a second passageway (15) configured to: (i) be in fluid communication with the first passageway (13), and (ii) convey, in use, the flowable molding material; and a wear-resistant assembly (16) contacting, at least in part, the first component (12) and the second component (14). Clause (2): the mold-tool system (10) of any clause mentioned in this paragraph, wherein: the second passageway (15) is in fluid communication with the first passageway (13) at a sealing interface (101) between the first component (12) and the second component (14); and the wear-resistant assembly (16) is positioned, at least in part, proximate to the sealing interface (101). Clause (3): the mold-tool system (10) of any clause mentioned in this paragraph, wherein: the wear-resistant assembly (16) is received, at least in part, by the first component (12). Clause (4): the mold-tool system (10) of any clause mentioned in this paragraph, wherein: the wear-resistant assembly (16) is received, at least in part, by the second component (14). Clause (5): the mold-tool system (10) of any clause mentioned in this paragraph, wherein: the wear-resistant assembly (16) is received, at least in part, by the first component (12) and by the second component (14). Clause (6): the mold-tool system (10) of any preceding claim, wherein: the wear-resistant assembly (16) includes (and is not limited to): a first wear-resistant assembly (106) received, at least in part, by the first component (12); and a second wear-resistant assembly (108) received, at least in part, by the second component (14). Clause (7): the mold-tool system (10) of any clause mentioned in this paragraph, wherein: the wear-resistant assembly (16) includes (and is not limited to): a first wear-resistant assembly (106) received, at least in part, by the first component (12); and a second wear-resistant assembly (108) received, at least in part, by the second component (14), the first wear-resistant assembly (106) contacting, at least in part, the second wear-resistant assembly (108). Clause (8): the mold-tool system (10) of any clause mentioned in this paragraph, wherein: the wear-resistant assembly (16) includes (and is not limited to): a first wear-resistant assembly (106) received, at least in part, by the first component (12); and a second wear-resistant assembly (108) received, at least in part, by the second component (14), the first wear-resistant assembly (106) contacting, at least in part, the second component (14), the second wear-resistant assembly (108) contacting, at least in part, the first component (12), and the first wear-resistant assembly (106) not contacting the second wear-resistant assembly (108). Clause (9): the mold-tool system (10) of any clause mentioned in this paragraph, wherein: the first component (12) includes a nozzle assembly (200), and the first passageway (13) includes a nozzle-melt channel (202) defined by the nozzle assembly (200); and the second component (14) includes a nozzle-tip assembly (300), and the second passageway (15) includes a tip-melt channel (302) defined by the nozzle-tip assembly (300). Clause (10): the mold-tool system (10) of any clause mentioned in this paragraph, wherein: the first component (12) includes a nozzle assembly (200), and the first passageway (13) includes a nozzle-melt channel (202) defined by the nozzle assembly (200); and the second component (14) includes a manifold assembly (400), and the second passageway (15) includes a manifold melt channel (402) defined by the nozzle-tip assembly (300). Clause (11): the mold-tool system (10) of any clause mentioned in this paragraph, wherein: the first component (12) includes a cross-manifold assembly (500), and the first passageway (13) includes a cross-manifold melt channel (502) defined by the cross-manifold assembly (500); and the second component (14) includes a main-manifold assembly (600), and the second passageway (15) includes a main-manifold melt channel (602) defined by the main-manifold assembly (600). Clause (12): the mold-tool system (10) of any clause mentioned in this paragraph, wherein: the first component (12) includes a cross-manifold assembly (500), and the first passageway (13) includes a cross-manifold melt channel (502) defined by the cross-manifold assembly (500); and the second component (14) includes a transfer-sprue assembly (700), and the second passageway (15) includes a transfer-sprue melt channel (702) defined by the transfer-sprue assembly (700). The FIGS. depict examples of the mold-tool system (10). It will be appreciated that the examples depicted in the FIGS. may be combined in any suitable permutation and combination.

It will be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, components, or software code that is superior to any of the equivalents available to the art. There is no particular mode of practicing the inventions and/or examples of the invention that is superior to others, so long as the functions may be performed. It is believed that all the crucial aspects of the invention have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. A mold-tool system (10), comprising:
    a first component (12) defining a first passageway (13) configured to convey, in use, a flowable molding material;
    a second component (14) defining a second passageway (15) configured to:
        (i) be in fluid communication with the first passageway (13), and
        (ii) convey, in use, the flowable molding material; and
    a wear-resistant assembly (16) contacting, at least in part, the first component (12) and the second component (14), the wear-resistant assembly configured to limit direct sliding-seal contact between the first component and the second component, and the wear-resistant assembly (16) includes:
        a first wear-resistant assembly (106) received, at least in part, by the first component (12); and
        a second wear-resistant assembly (108) received, at least in part, by the second component (14).

2. The mold-tool system (10) of claim 1, wherein:
    the second passageway (15) is in fluid communication with the first passageway (13) at a sealing interface (101) between the first component (12) and the second component (14); and
    the wear-resistant assembly (16) is positioned, at least in part, proximate to the sealing interface (101).

3. The mold-tool system (10) of claim 1, wherein:
    the first wear-resistant assembly (106) contacts, at least in part, the second wear-resistant assembly (108).

4. The mold-tool system (10) of claim 1, wherein:
    the first wear-resistant assembly (106) contacts, at least in part, the second component (14), the second wear-resistant assembly (108) contacts, at least in part, the first component (12), and the first wear-resistant assembly (106) do not contact the second wear-resistant assembly (108).

5. The mold-tool system (10) of claim 1, wherein:
    the first component (12) includes a nozzle assembly (200), and the first passageway (13) includes a nozzle-melt channel (202) defined by the nozzle assembly (200); and
    the second component (14) includes a nozzle-tip assembly (300), and the second passageway (15) includes a tip-melt channel (302) defined by the nozzle-tip assembly (300).

6. The mold-tool system (10) of claim 1, wherein:
    the first component (12) includes a nozzle assembly (200), and the first passageway (13) includes a nozzle-melt channel (202) defined by the nozzle assembly (200); and
    the second component (14) includes a manifold assembly (400), and the second passageway (15) includes a manifold melt channel (402) defined by the nozzle-tip assembly (300).

7. The mold-tool system (10) of claim 1, wherein:
    the first component (12) includes a cross-manifold assembly (500), and the first passageway (13) includes a cross-manifold melt channel (502) defined by the cross-manifold assembly (500); and
    the second component (14) includes a main-manifold assembly (600), and the second passageway (15) includes a main-manifold melt channel (602) defined by the main-manifold assembly (600).

8. The mold-tool system (10) of claim 1, wherein:
    the first component (12) includes a cross-manifold assembly (500), and the first passageway (13) includes a cross-manifold melt channel (502) defined by the cross-manifold assembly (500); and
    the second component (14) includes a transfer-sprue assembly (700), and the second passageway (15) includes a transfer-sprue melt channel (702) defined by the transfer-sprue assembly (700).

9. A molding system (900) having the mold-tool system (10) of claim 1.

10. A runner system having the mold-tool system (10) of claim 1.

11. A method of operating a mold-tool system (10), the method comprising:
    conveying a flowable molding material along a first passageway (13) defined by a first component (12);
    conveying a flowable molding material along a second passageway (15) defined by a second component (14);
    fluidly communicating the first passageway (13) with the second passageway (15); and
    contacting a wear-resistant assembly (16) with the first component (12) and the second component (14), the wear-resistant assembly configured to limit direct sliding-seal contact between the first component and the second component, and wherein the wear-resistant assembly (16) includes:
        a first wear-resistant assembly (106) received, at least in part, by the first component (12); and
        a second wear-resistant assembly (108) received, at least in part, by the second component (14).

12. The method of any preceding claim 11, further comprising:
   fluidly communicating the second passageway (15) with the first passageway (13) at a sealing interface (101) between the first component (12) and the second component (14); and
   positioning, at least in part, the wear-resistant assembly (16) proximate to the sealing interface (101).

* * * * *